Oct. 3, 1950 J. B. TIEDEMANN 2,524,369
METHOD OF ELECTRIC FLASH WELDING CYLINDRICAL
MEMBERS AND PRODUCT THEREOF
Filed Aug. 22, 1945 3 Sheets-Sheet 1
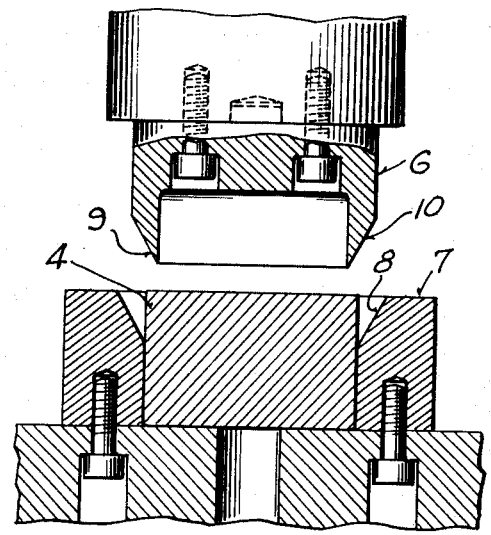
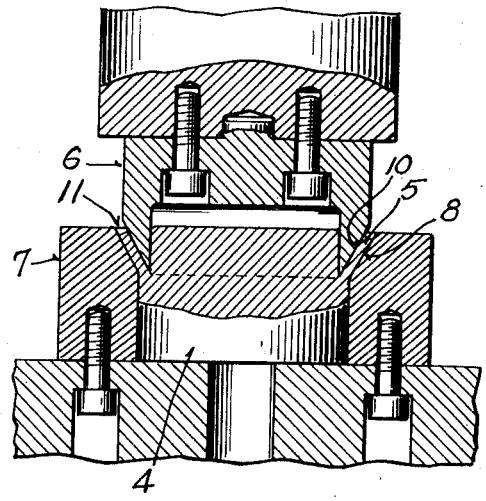
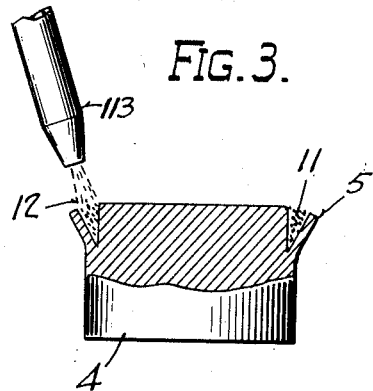
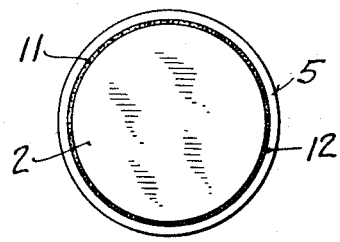
Julius B. Tiedemann
INVENTOR.
BY
ATTORNEY.

Oct. 3, 1950    J. B. TIEDEMANN    2,524,369
METHOD OF ELECTRIC FLASH WELDING CYLINDRICAL
MEMBERS AND PRODUCT THEREOF
Filed Aug. 22, 1945    3 Sheets-Sheet 2

Julius B. Tiedemann
INVENTOR.

BY
ATTORNEY.

Oct. 3, 1950
J. B. TIEDEMANN
2,524,369
METHOD OF ELECTRIC FLASH WELDING CYLINDRICAL
MEMBERS AND PRODUCT THEREOF
Filed Aug. 22, 1945
3 Sheets-Sheet 3
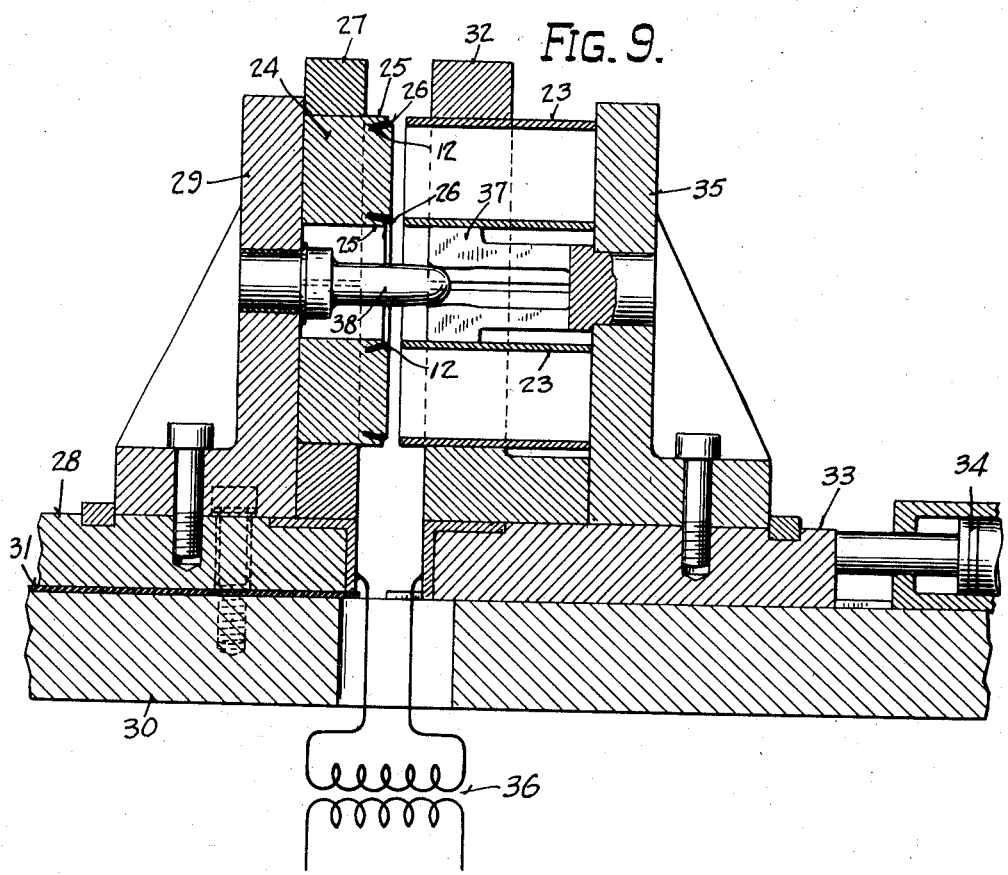
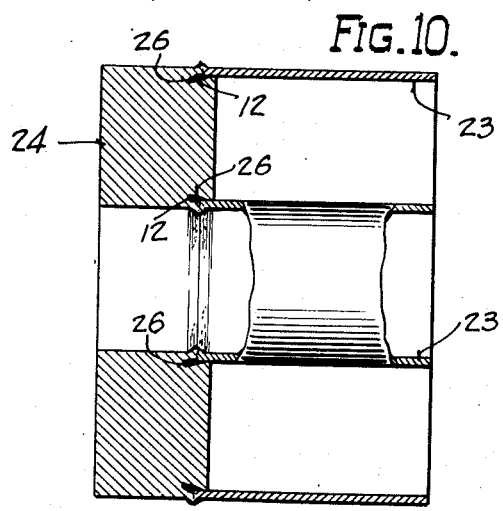
Julius B. Tiedemann
INVENTOR.
BY
ATTORNEY.

Patented Oct. 3, 1950

2,524,369

UNITED STATES PATENT OFFICE 2,524,369

METHOD OF ELECTRIC FLASH WELDING CYLINDRICAL MEMBERS AND PRODUCT THEREOF

Julius B. Tiedemann, Milwaukee, Wis., assignor to A. O. Smith Corporation, Milwaukee, Wis., a corporation of New York Application August 22, 1945, Serial No. 612,103

4 Claims. (Cl. 219—10)

This invention relates to electric flash welding and products thereof, and particularly to the flash welding of closed tubular members wherein it is desired to avoid flash of the metal at the joint on the inside of the structure.

The use of mandrels inside a tubular member for the preventing of flash, as in circumferential seams, is not always practical. This is particularly so in the flash welding of a cylindrical skirt to the head of a piston where the skirt has inner bearings for the wrist pin of a crank, and the like.

The principal object of the present invention is to prevent the flash from forming on one side of the joint in electric flash welding.

Another object of the invention is to provide a flash welded joint which is protected by an extension of one of the parts adjacent the joint.

Another object is to prevent by-passing of the joint by the welding current in flash welding a structure in which one of the parts overlaps the joint.

Another object is to provide for flash welding of parts of different thickness and wherein it is not practical to reduce the thickness of the thicker piece to match that of the thinner piece.

A more specific object of the invention is to provide a piston or the like having the skirt electric flash welded to a closure head.

A further object is to provide a novel method of flash welding a thin tube to a thick end closure and the like.

A further object is to provide a method of flash welding a skirt to the head of a piston.

Other objects of the invention will appear hereinafter in connection with a more detail description of the invention as illustrated in the accompanying drawings.

In the drawings:

Figure 1 is a sectional view of thick bar stock out of which a piston head is formed with the stock confined in a die and a cutter member in position preparatory to forming a flange therein;

Fig. 2 is a view similar to Fig. 1 showing the head with the flange formed and the cutter at final forming position;

Fig. 3 is a sectional view showing the head being sprayed with insulating material;

Fig. 4 shows the re-forming of the flange by passing the head through a forming die and with the punch in an intermediate position;

Fig. 5 is a plan view of the formed head;

Fig. 9 is a sectional view showing the application of the invention to the closing of a circular space between two concentric tubes; and Fig. 10 is a view similar to Fig. 7 showing the product of the welding in Fig. 9.

Figure 6:
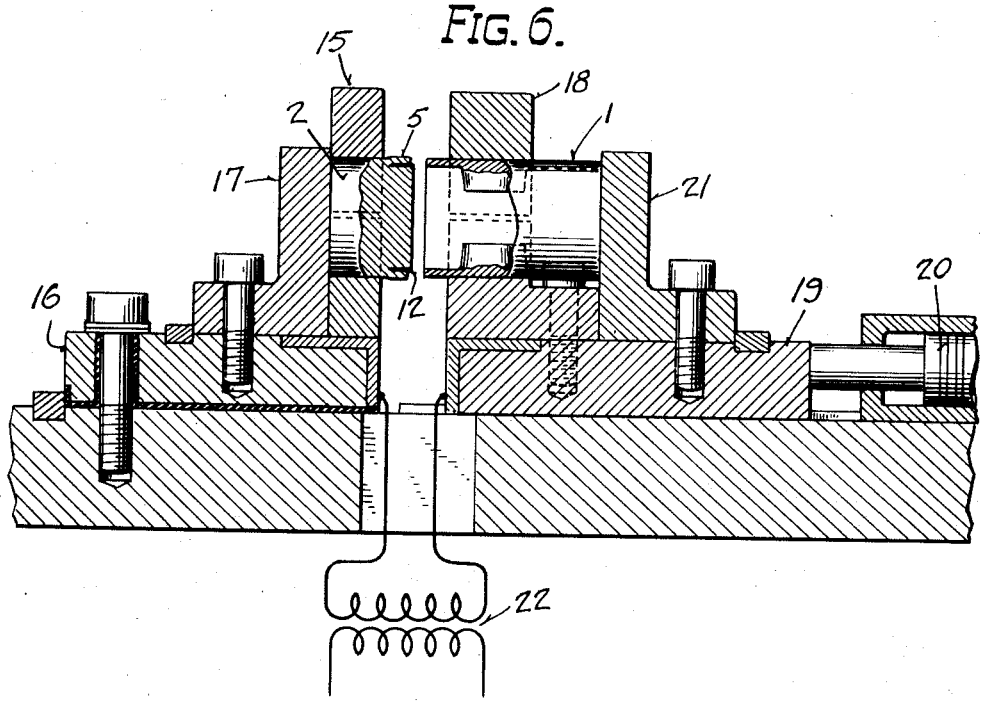
Fig. 6 is a sectional view of the skirt and head in position to be flash welded together.

The piston illustrated in Figs. 1 to 8, comprises a cylindrical tube or skirt 1, one end of which is secured to the thick block or head 2 by the electric flash weld 3.

In making the piston the head 2 is first formed from the bar stock 4. The initial operation comprises providing bar stock 4 with the annular flange 5, which is ordinarily accomplished by forging or machining.

In the drawings illustrating the invention as shown in Figs. 1 and 2 the flange 5 is formed in a forging operation by the cutter 6 and the die 7.

In carrying out this operation, the bar stock 4 is first confined within a central die opening in the die 7, the upper inner circumferential surface 8 of the die being of conical shape to receive the flange of the upper end portion of bar stock 4 when the cutting die 6 forms the flange outwardly as shown in Fig. 2.

The cutter 6 which is located axially above the die 7 is adapted to move downwardly toward the die to operate upon bar stock 4 as the latter is held by the die.

The cutter 6 is provided on the bottom periphery with the knife-like edge 9 which is of conical shape on the outer circumference 10 and tapers complementary to the conical upper surface 8 of die 7.

The edge 9 engages the rim of bar stock 4 as cutter 6 moves downwardly and penetrates the stock to a depth sufficient to cut the annular flange 5 therefrom and expand the flange outwardly by the outer surface 10 against conical surface 8 of die 7. The cutter 6 is then raised and bar stock 4 is removed from the dies. The cutter 6 is of such dimensions as to cut flange 5 to a cross-section substantially equal to that of the wall of tube 1.

The crevice or space 11 formed between the flange 5 and the body of bar stock 4 is then filled with insulating material 12 such as water glass or the like. The insulating material 12 is preferably deposited by a spray gun 113 as illustrated in Fig. 3. Either the spray gun or bar stock 4 may be rotated until the crevice 11 is completely filled with insulation.

The bar stock 4 is next placed in to the vertical, cylindrical opening of the forming die 13 with the flange 5 extending diagonally outward over the rim of the die.

The punch 14 disposed above the die 13 is thereafter lowered into contact with the bar stock 4 and drives the latter downwardly into the cylindrical opening of the die. As the bar stock 4 travels downwardly within die 13 flange 5 strikes the upper curved edge of the die and is forced inwardly toward the body of the bar stock until the flange is substantially parallel thereto. The bar stock 4 may be ejected from the bottom of the die 13 by further movement of the punch 14. Since this is the last forming operation on bar stock 4, it now has been formed into the head 2 for welding to the tube 1 to form the completed piston. The flange 5 of block 2 is concentric to the body portion of the block and extends parallel to the axis of the head.

Annular crevice or groove 11 is retained in block 2 but is considerably less in diameter than when first provided in bar stock 4. After forming the flange 5 is of slightly less height than the body of block 2. The insulating material 12 completely fills the crevice or groove 11 and also extends upwardly around the rim of the body portion of the piston where it is squeezed in the forming operation to insulate the area that is covered thereby.

The groove 11 may be formed by machining and then filled with the insulation 12, in which case the outside of head 2 remains of uniform diameter. Where the operations of forming the flange 5, shown in the drawing, are employed the flange has a slightly larger diameter than the remainder of head 2 and must be machined either before welding or after welding to provide the required uniform diameter for the piston. The drawings exaggerate the differential in diameter between flange 5 and head 2, this differential being kept as low as possible.

Fig. 6 illustrates the flash welding operation in which the tube 1 is joined to head 2 by weld 3. This operation may be carried out in a number of different ways.

In the operation illustrated, head 2 is horizontally mounted in the electrode 15 with the flange 5 exposed. The electrode 15 is secured to the stationary table 16 and is additionally supported by the backing plate 17 also secured to table 16.

The tube skirt 1 is horizontally mounted within the electrode 18 in a position axially opposed to block 2. The electrode 18 is secured to the table 19 and the latter is reciprocably moved by the piston 20 in a suitable hydraulic cylinder. The backing plate 21 is bolted to the table 19 and supports skirt 1 in welding the latter to block 2. Current is supplied to the electrodes 15 and 18 through the transformer 22.

After assembly in the welding machine as described the end of the tube 1 is welded to the flange of the block section under ordinary flash welding procedure in which the electrode 18 carrying the tube 1 is moved toward the electrode 15 within which block 2 is held.

In the flash welding operation the welding current is concentrated at the line of flashing contact between the end edge of flange 5 and the adjacent end of tube 1. The insulating material 12 prevents the current from by-passing the edges and flowing directly from the skirt 1 radially to the adjacent thick body section of the head 2.

Figure 7:
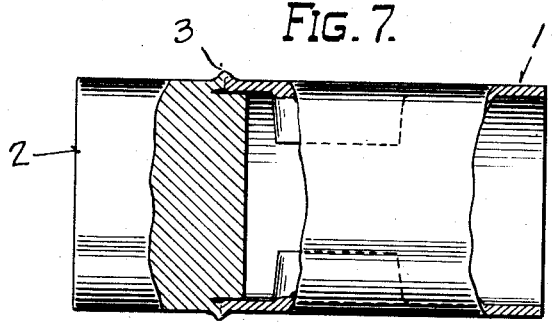
Fig. 7 is a sectional view of a welded piston before the flash has been removed.

The metal at the weld area is upset and the flash is forced outwardly of the line of contact of the head and skirt where the flash is readily removed. Some of the flash may back into the crevice 11 from where it need not be removed. Flash in the corner area between the skirt 1 and head 2 is substantially eliminated as illustrated in Fig. 7.

As shown in the drawing the body portion of head 2 is concentric with the joint and extends on the inside of the joint substantially across the seam.

The invention may be applied to other structures than pistons. Figs. 9 and 10 illustrate another embodiment of the invention in which a pair of concentric tubes 23 are flash welded simultaneously to the generally thick closure block 24.

The block 24 has a central opening of approximately the same diameter as the inside diameter of the smaller tube 23 and the block 24 has an outer diameter approximating that of the larger tube 23. Prior to the flash welding operation the block 24 is provided with the inner and outer annular flanges 25. The flanges 25 are shown as machined from the block 24 by the cutting of a groove 26 to separate the corresponding flange from the body portion of the block. The grooves 26 are ordinarily provided at an angle and extend deeper into the block 24 than in the case of the first embodiment. The top of the flange 25 is machined off to a lower level than the top of the body portion of block 24.

In order to insulate the flanges 25 from the thick part of block 24, the respective grooves 26 are filled with the insulating material 12 employed in the first embodiment of the invention as described. The insulating material also covers the circumferential rim of the body portion of the block 24 that lies above the outer end of the flange 25. The insulation prevents current from traveling across the groove 26 from the tubes 23 to the thick body portion of block 24 during welding.

Figure 8:
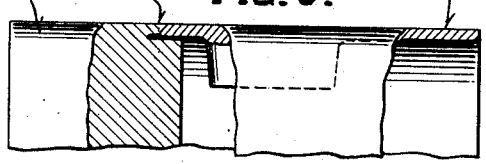
Fig. 8 is a view similar to Fig. 7 after removal of the flash and machining of the skirt and head.

As in the case of the previous embodiment the welding of the tubes 23 to block 24 may be accomplished in a number of different ways. Fig. 8 illustrates one method in which both tubes are welded to the block simultaneously.

The block 24 is horizontally mounted within the electrode die 27 with the flanges 25 exposed. The electrode 27 is secured to the stationary table 28 and is backed up by the bracket 29 also secured to table 28. Table 28 is supported on bed 30 and is insulated therefrom by insulation 31.

The tubes 23 are horizontally mounted within the electrode 32 in a position opposed to block 24. The electrode 32 is secured to the table 33 and the latter is reciprocably moved over bed 30 by the hydraulic piston 34. The electrode 32 is backed up by the bracket 35 which is also secured to the table 33.

Current is supplied to the electrodes 27 and 32 through the transformer 36. A split mandrel 37 is supported horizontally within bracket 35 and is expanded by a wedge plug 38 mounted in bracket 29. The plug 38 is insulated from bracket 29 and extends laterally through the central opening in block 24 and axially into mandrel 37.

As the table 33 carrying electrode 32 is moved toward electrode 27 by hydraulic piston 34, wedge plug 38 is driven into mandrel 37 and forces the mandrel outwardly against the inner concentric tube 23 to hold the tube for welding to block 24 and to carry current to the tube from bracket 35 to accomplish the welding operation.

When welding contact is made between tubes 23 and block 24 the tubes 23 are simultaneously flash welded to the corresponding inner and outer flanges 25 of the block.

Fig. 10 shows the tubes 23 and block 24 finally welded together and before the flash has been removed. As in the case of the previous embodiment flash in the corner areas between the tubes and block is eliminated. The flash is either forced to the outside where it is easily machined off, or is driven into the respective crevices 26. The metal at the weld area is upset outwardly.

The invention provides a method of producing flash or resistance welds that finds particular employment where it is desired to weld together pieces or parts of different thicknesses or members of generally cylindrical shape. The method of the invention provides a means of directing the welding current across the edges and eliminates any tendency of the current to by-pass the edges where a part overlaps the joint.

Various embodiments of the invention may be employed within the scope of the accompanying claims.

I claim:

1. A flash welded piston comprising a generally circular head having a circular recess filled with electrically insulating material to confine the flash and insulate the parts in welding thereof and radially segregating an outer flange portion extending axially thereof adjacent and concentric with the body thereof, and a cylindrical tubular skirt member electric flash welded to the edge of said flange at a circumferential joint radially removed from the body of said head and with the body of the head disposed radially inside said joint and separated therefrom by said insulation, said head flange and skirt having substantially the same outer diameter to fit a cylinder wall.

2. The method of making a piston which comprises forming an angular extending annular circumferential flange on the outside of a cylindrical metal block, disposing insulating material in the crevice between the flange and body of the block, forcing said flange inwardly to a position parallel to the outer surface of the body of the block and to secure the electrically insulating material within said crevice and with the same outwardly of the crevice and around the rim of the body portion of said block, and electrically butt welding a tubular skirt member to the edge of said flange at a circumferential joint disposed radially from the body of the block, the insulating material preventing flow of welding current betwen the body of the block and the skirt and directing the current across the weld line between the tube and flange.

3. The method of welding two tubular metal members of different inner diameters comprising forming a frusto-conical flange circumferentially of the body of the thicker of said members, disposing electrically insulating material in the crevice between the flange and the body of said member, forming said flange inwardly to dispose the flange adjacent the body of said member to confine the insulating material within said crevice and to dispose the flange cylindrically in a position to correspond in diameter with the other member, and electric butt welding said other member and said flange along a circumferential weld joint adjacent the body of said first named member with said insulating material between the weld and said body.

4. The method of making a welded article composed of at least two cylindrical metal members welded together, one member being of greater radial thickness than the other member, comprising providing a circumferential axially extending flange on the thicker member of substantially the same thickness as the thinner member, the free end of said flange being radially spaced from the body of the thick member and terminating short of the end face of the body of the thick member whereby a radial space is provided between the flange and body of the thicker member and providing an exposed circumferential surface on said body, substantially completely filling said radial space with electrical insulating material and covering substantially all of the exposed circumferential surface of the body with said material, and electrically flash welding the thinner member to the edge of said flange with the portion of the thinner member approaching the weld joint overlying said insulation whereby the insulating material substantially prevents flow of current from the thinner member directly to the body of the thick member, the flash from the weld being driven principally outwardly of the weld area by the proximity of the insulating material to the weld joint.

JULIUS B. TIEDEMANN.

REFERENCES CITED

The following references are of record in the file of this patent:

UNITED STATES PATENTS

| Number | Name | Date |
| --- | --- | --- |
| 1,085,090 | Lachman | Jan. 20, 1914 |
| 1,215,966 | Murray | Feb. 13, 1917 |
| 1,216,955 | Daggett | Feb. 20, 1917 |
| 1,665,468 | Murray | Apr. 10, 1928 |
| 1,828,340 | Reed | Oct. 20, 1931 |
| 1,912,993 | Murray | June 6, 1933 |
| 2,198,771 | Hazen et al. | Apr. 30, 1940 |
| 2,245,298 | Proctor | June 10, 1941 |
| 2,246,942 | Janney et al. | June 24, 1941 |

FOREIGN PATENTS

| Number | Country | Date |
| --- | --- | --- |
| 363,486 | Great Britain | Dec. 24, 1931 |
| 546,737 | Great Britain | July 28, 1942 |